H. FAHRENHEIM.
APPARATUS FOR PRODUCING A CONSTANT GAS SUPPLY FOR CALORIMETRIC AND OTHER PURPOSES.
APPLICATION FILED FEB. 15, 1910.
994,990.
Patented June 13, 1911.
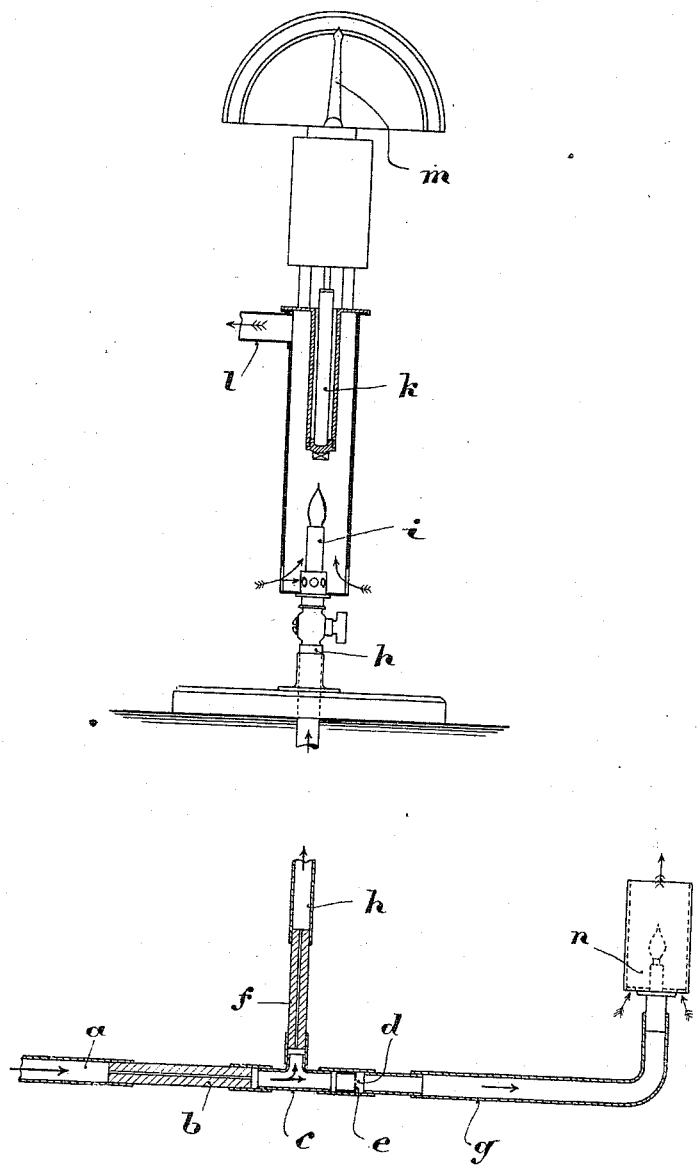
Witnesses:
Daniel Holmgren.
Katheryne Koch.
Inventor:
Hans Fahrenheim

UNITED STATES PATENT OFFICE.

HANS FAHRENHEIM, OF ESSEN, GERMANY.

APPARATUS FOR PRODUCING A CONSTANT GAS-SUPPLY FOR CALORIMETRIC AND OTHER PURPOSES.

994,990. Specification of Letters Patent. Patented June 13, 1911.

Application filed February 15, 1910. Serial No. 544,065.

*To all whom it may concern:*

Be it known that I, HANS FAHRENHEIM, a subject of the King of Prussia, residing at Essen, Germany, have invented a new and Improved Apparatus for Producing a Constant Gas-Supply for Calorimetric and Similar Purposes, of which the following is a specification.

In apparatus used for the discharge or emission of constant streams of gaseous matter, capillary tubes are in some cases used for the purpose of rendering the rate of discharge more or less independent of changes of specific gravity. To secure complete independence, the ratio of the length to the diameter of the tube would have to be infinitely great. In practice, therefore, the influence of specific gravity is never entirely obviated by the means referred to, more particularly in apparatus used for delivering predetermined quantities of gas per unit of time, as in certain calorimeters. In most cases the gas is only slightly above normal atmospheric pressure, so that the ratio of length and diameter of the tube must be very far from the ideal indicated. It has been established by careful tests that under these conditions there is actual dependence between the rate of emission and the specific gravity of the gas, the dependence being linear in the sense that with decreasing specific gravity the velocity of the gas in the tube increases.

The object of the present invention is to provide apparatus which enables considerable, practically uniform, quantities of gas to be discharged per unit of time, independently of changes of specific gravity. Substantially the invention consists in using in addition to a capillary discharge tube of adequate dimensions, which conveys the gas to the calorimeter etc., a small orifice in a thin wall, through which gas is discharged to the burner, the gas issuing from the capillary discharge tube being alone used for the measurement, test or other purpose for which a constant gas supply is required. In order to still further eliminate the influence of the specific gravity upon the quantity of the gas withdrawn for calorimetric use, a capillary inlet tube may be arranged in advance of the discharge tube and orifice, which will effect a preliminary regulation of the gas passing through said discharge tube and orifice.

The theory of the combination described is as follows:—Under normal, constant conditions the rates of flow through the tube and hole respectively bear a definite, constant relation to each other. This relation is, however, at once upset if the conditions change. This is due to the fact that the rate of flow through the tube is subject to linear variation, whereas the rate of flow through the small orifice in the thin wall is subject to quadratic variation. With constant gas-pressure, the square of the velocity of emission from the hole in the wall is inversely proportional to the specific gravity of the gas. On the other hand, the velocity in the tube undergoes only linear variation, so that the quantitative change due to change of specific gravity occurs mainly at the hole. In other words, if the passage afforded by the hole were not available, the total effect of change of specific gravity would be evidenced in a quantitative change in the emission by the tube, whereas the provision of the hole causes the greater part of the change to be transferred to the hole. The change in the rate of delivery of the tube is then practically negligible.

A construction embodying the combination described is shown in section parts being in elevation in the accompanying drawing.

In the drawing, $a$ represents a conduit through which the gas flows from a pressure regulator through a capillary inlet tube $b$ into a chamber $c$. A comparatively thin wall $e$ in the latter is provided with a minute discharge orifice $d$ from which the outflowing gas is led by a pipe $g$ into the atmosphere and is preferably ignited at a burner $n$, so as to prevent a discharge of the gas into the room. Chamber $c$ communicates further with a capillary outlet tube $f$, which is in turn connected by a pipe $h$ to the calorimeter or other testing device. The latter is shown to consist of a burner $i$ for the gas discharged through tube $f$, above which burner a rod $k$ of readily expansible metal is arranged. The expansion or contraction of this rod is indicated by a pointer $m$, while the burned gas is discharged through chimney $l$.

It will be seen that by the construction described, the undesirable effect of the specific gravity of the gas upon the quantity admitted to the calorimetric measuring device is almost nullified, so that the results obtained represent the practically true calorific value of the gas.

What I claim as my invention and desire to secure by Letters Patent of the United States is:—

1. In an apparatus for producing a constant gas supply for calorimetric use, a gas conduit having a minute orifice through which part of the gas is discharged into the atmosphere, and a capillary outlet tube communicating with said conduit in advance of the orifice, which tube conveys the residual gas to a testing device.

2. In an apparatus for producing a constant gas supply for calorimetric use, a gas conduit having a comparatively thin transverse wall provided with a minute orifice through which part of the gas is discharged into the atmosphere, and a capillary outlet tube communicating with said conduit in advance of the orifice, which tube conveys the residual gas to a testing device.

3. In an apparatus for producing a constant gas supply for calorimetric use, a capillary gas inlet tube, a chamber communicating therewith and having an apertured wall through which part of the gas is discharged into the atmosphere, and a capillary gas outlet tube communicating with the chamber and conveying the residual gas to a testing device.

Signed by me at Barmen, Germany, this 31st day of January 1910.

HANS FAHRENHEIM. [L. S.]

Witnesses:
   CHAS. J. WRIGHT,
   OTTO KÖNIG.

---

Copies of this patent may be obtained for five cents each, by addressing the "Commissioner of Patents, Washington, D. C."